US005677482A

United States Patent [19]

Gee et al.

[11] Patent Number: 5,677,482

[45] Date of Patent: Oct. 14, 1997

[54] DETERMINING THROTTLE POSITION SENSOR OUTPUT

[75] Inventors: Thomas Scott Gee, Canton; Michael Thomas Conlin, Westland; Graham Arthur Snow, Novi; Marsha Wendel, New Boston; Todd Leonard Rachel, Canton, all of Mich.

[73] Assignee: Ford Global Technologies, Inc., Dearborn, Mich.

[21] Appl. No.: 418,226

[22] Filed: Apr. 6, 1995

[51] Int. Cl.⁶ .......................... G01M 15/00; G01M 19/00

[52] U.S. Cl. .......................... 73/118.1; 7/118.2

[58] Field of Search .......................... 73/118.1, 118.2, 73/116

[56] References Cited

U.S. PATENT DOCUMENTS

| | | | |
|---|---|---|---|
| 4,901,561 | 2/1990 | Glowczewski | 73/118.1 |
| 5,018,385 | 5/1991 | Frick | 73/118.2 |
| 5,127,263 | 7/1992 | Iizuka | 73/118.1 |
| 5,138,873 | 8/1992 | Amano | 73/118.1 |
| 5,157,956 | 10/1992 | Isaji et al. | 73/118.1 |
| 5,159,831 | 11/1992 | Kitagawa et al. | 73/118.1 |
| 5,165,272 | 11/1992 | Kleinhans et al. | 73/118.2 |
| 5,321,980 | 6/1994 | Hering et al. | 73/118.1 |
| 5,339,681 | 8/1994 | Sekozawa et al. | 73/118.2 |

*Primary Examiner*—George M. Dombroske

*Attorney, Agent, or Firm*—Peter Abolins

[57] ABSTRACT

A signal indicating closed throttle position is corrected, through increases and decreases, as a function of an engine's volumetric efficiency, engine speed, application of a vehicle's brake, and the selection of a transmission gear.

1 Claim, 1 Drawing Sheet

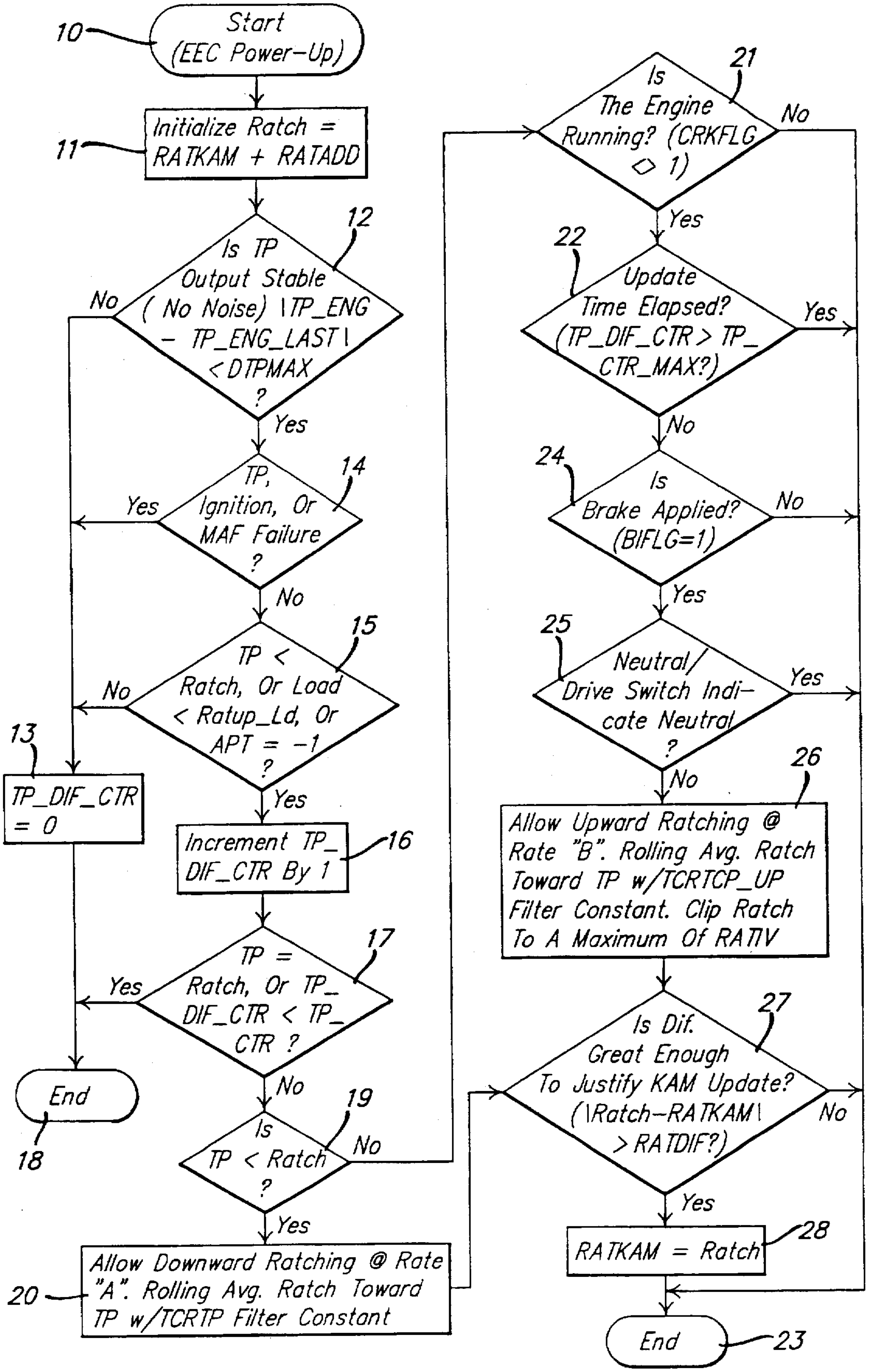
10
Start
(EEC Power-Up)
11
Initialize Ratch = RATKAM + RATADD
12
Is TP Output Stable ( No Noise) \TP_ENG − TP_ENG_LAST\ < DTPMAX ?
No
Yes
14
TP, Ignition, Or MAF Failure ?
Yes
No
15
TP < Ratch, Or Load < Ratup_Ld, Or APT = −1 ?
No
Yes
13
TP_DIF_CTR = 0
16
Increment TP_DIF_CTR By 1
17
TP = Ratch, Or TP_DIF_CTR < TP_CTR ?
Yes
No
End
18
19
Is TP < Ratch ?
No
Yes
20
Allow Downward Ratching @ Rate "A". Rolling Avg. Ratch Toward TP w/TCRTP Filter Constant
21
Is The Engine Running? (CRKFLG ◇ 1)
No
Yes
22
Update Time Elapsed? (TP_DIF_CTR > TP_CTR_MAX?)
Yes
No
24
Is Brake Applied? (BIFLG=1)
No
Yes
25
Neutral/Drive Switch Indicate Neutral ?
Yes
No
26
Allow Upward Ratching @ Rate "B". Rolling Avg. Ratch Toward TP w/TCRTCP_UP Filter Constant. Clip Ratch To A Maximum Of RATIV
27
Is Dif. Great Enough To Justify KAM Update? (\Ratch−RATKAM\ > RATDIF?)
No
Yes
28
RATKAM = Ratch
End
23

DETERMINING THROTTLE POSITION SENSOR OUTPUT

BACKGROUND OF THE INVENTION

1. Field of the Invention

This invention relates to controlling the operation of an internal combustion engine.

2. Prior Art

It is known to use electronic engine controls to control the operation of an internal combustion engine. In particular, it is known to control the air/fuel ratio in response to various inputs such as exhaust gas oxygen, air temperature, and throttle position. However, determining throttle position, in particular closed throttle position, is difficult because of various drifts or off-sets. This is one of the problems this invention overcomes.

More specifically, a throttle body (TB) is a device used on a modern internal combustion (I.C.) engine to control the flow of air entering the intake manifold. TB's generally consist of a throttle plate inside of a bore and attached to a throttle shaft. At one end of the shaft is an attachment point for a cable which the vehicle operator uses to control the amount of air flow. At the other end is a throttle position sensor (TPS) which feeds back throttle shaft angular position to the electronic engine control (EEC) module. TPS's generally produce a low signal at closed throttle and the output increases as the throttle opens, however the opposite can also be true. Usually there is also attached to the TB a device, called an air bypass valve, used to control air flow around the throttle plate for idle and dashpot control. The air bypass valve is usually a pulse width modulated solenoid valve controlled by the EEC.

It is known to use a method to determine throttle position (TP) using a "Ratch" algorithm which is initialized, on power up, to a high value. The algorithm then proceeds to find the lowest value of TPS output and stores that value as RATCH. Ratch is then used to calculate a relative throttle position (TP_REL=TP−RATCH), which in turn is used by the engine control strategy to determine a mode of operation (idle mode RPM control, part throttle, wide open throttle, transmission shift schedules). RATCH is re-initialized on every power-up. In idle Mode, RPM control is used, exhaust gas recirculation is disabled, and other actions are taken to provide a stable engine idle. In Part Throttle Mode, closed loop fuel control is used, EGR is enabled and a pre-position dashpot function is employed to provide smooth power and low emissions. In Wide Open Throttle Mode, open loop fuel control is used, and other actions are taken to provide maximum power. Entry into each of these modes occurs at a fixed value of TP_REL, so it is advantageous that TP_REL be accurate to ensure good driveability.

Thus, it is known to use a software ratch algorithm which is initialized on power up to a high value. The algorithm then proceeds to find the lowest value of TPS output and stores that value. This stored low value can then be used to calculate a relative throttle position.

One problem with such a known system is if an incorrect (e.g. low) value is stored in RATCH, there is no corrective or recovery action until the next power-up. This can lead to unstable idle, acceleration hesitations and other drive concerns. It is believed that such concerns reduce customer satisfaction and increase TPS warranty costs.

Until now providing a means for allowing RATCH to learn up (i.e. to increase the magnitude of the signal indicating closed throttle) has not been implemented. This is because of the inability to discern a part throttle mode due to TPS drift, thermal dimensional variation, intermittent electrical continuity, and the variations, from a true part throttle mode demanded by operator input.

However, it is known to use a hardware idle switch to indicate closed throttle position and enable idle mode operation. This solution is costly and tolerance sensitive, since it requires a hardware switch, wiring, EEC inputs and outputs, on-board/off-board diagnostic capability and is subject to assembly variation and errors. These are some of the problems this invention overcomes.

SUMMARY OF THE INVENTION

This invention deals with the interpretation of the TPS signal and its interactions with the air bypass valve. More particularly, this invention teaches continuous learning and updating of the closed throttle position output of the throttle position sensor to correct for sensor drift, thermal dimensional variations, intermittent electrical continuity, and any other source of variation. True increases in closed throttle position sensor output due to the above reasons can be differentiated from small throttle openings requested by the vehicle operator.

This invention eliminates short comings of current methods for determining closed throttle TPS output which are uni-directional, downward learning only, and provides a means for learning up. Throttle position sensor drift, thermal dimensional variation, intermittent electrical continuity and other sources of variation can cause a low value to be stored as closed throttle position. As a result the TPS may never again produce output indicative of closed throttle, causing poor idle quality. Poor idle quality is undesirable both in repair costs and in customer satisfaction.

In accordance with an embodiment of this invention, closed throttle position is corrected as a function of an engine's volumetric efficiency, engine speed, application of a vehicle's brake, and the selection of a transmission gear.

BRIEF DESCRIPTION OF THE DRAWINGS

The FIGURE is a logic flow diagram of an algorithm for determining throttle position sensor output at closed throttle in accordance with an embodiment of this invention.

DETAILED DESCRIPTION

Referring to the FIGURE, a Ratch algorithm in accordance with the embodiment of this invention starts at a block 10 to start-up and proceeds to a block 11 wherein Ratch is initialized by adding the calibrateable parameter, RATADD to the Ratch value from last power-up (RATKAM). From block 11 logic flow proceeds to a decision block 12 wherein it is asked if throttle position output (TP) is stable. If no, indicating noise, logic flow goes to a block 13 where the background loop counter is set to 0. Then the algorithm ends at a block 18. If yes, indicating a lack of noise, logic flow goes to a decision block 14 where it is asked if throttle position (TP), ignition or mass air flow (MAF) has failure. If yes, logic again goes to block 13 and then the algorithm ends at block 18. If no, logic flow goes to a decision block 15 wherein the throttle is checked for closed position.

Closed throttle is signaled if the throttle position (TP) value is less than the RATCH value, the load value (volumetric efficiency) is less than the calibrateable parameter, RAT_UP_LD, or the at part throttle flag (APT) is equal to −1. If the throttle is not closed, logic flow again goes to block 13 and the algorithm ends at block 18. If the throttle is closed, logic flow then goes to a block 16 wherein the background counter loop (TP_DIF_CTR) is incremented by one. From block 16 logic flow goes to a decision block 17 wherein it is checked if the throttle position (TP) value is equal to the RATCH value or the background loop counter (TP_DIF_CTR) value is less than the calibrateable parameter (TP_CTR) value. If either of the two conditions applies, the algorithm ends at block 18. If both conditions do not apply, logic flow goes to a decision block 19 wherein it is asked if the throttle position (TP) value is less than the RATCH value. If yes, logic flow goes to a block 20 wherein there is downward Ratching at the rate of A and through the use of a rolling average calculation. From block 20, logic flow goes to a block 27 wherein it is determined if the difference between the current RATCH value and the RATCH value stored in non-volatile memory (RATKAM) is great enough to update the RATKAM value. If yes, logic flow goes to a block 28 where RATKAM is updated with the value of RATCH. The algorithm then ends at a block 23. If, at block 27, the difference is not great enough to justify an update of KAM, the algorithm ends at block 22.

If, at decision block 19, the throttle position (TP) value is not less than the RATCH value, then logic flow goes to a decision block 20 wherein it is asked if the engine is running. If no, the algorithm ends at block 22. If yes, logic flow goes to a decision block 21 wherein it is asked if the update time has lapsed. If yes, the algorithm ends at block 23. If no, logic flow goes to a block 24 wherein it is asked if the brake is applied. If no, the algorithm ends at block 23. If yes, logic flow goes to a block 25 wherein it is asked if the neutral/drive switch indicates that the vehicle is in neutral. If yes, the algorithm ends at block 23. If no, logic flow goes to a block 26 which allows upward Ratching at the rate of B throug the use of a rolling average calculation. From block 26, logic flow goes to block 27 wherein it is determined if the difference between the current RATCH value and the RATCH value stored in non-volatile memory (RATKAM) is great enough to update the RATKAM value. If yes, logic flow goes to block 28 where RATKAM is updated with the value of RATCH. The algorithm then ends at block 23. If, at block 27, the difference is not great enough to justify an update of KAM, the algorithm ends at block 23.

Thus the Throttle Ratch algorithm is designed to continuously seek the closed throttle TP output value. This value can change as a function of time, temperature, vibration, environmental, mechanical and electrical conditions. Since this value can increase as well as decrease it is necessary to allow ratch to adjust in both directions.

The invention is a method of continuously learning and updating a RATCH value in both the up and down direction. Since it is difficult to distinguish between an operator demanded part throttle mode from a erroneous part throttle mode a first logical decision and a second logical decision are used to avoid this problem.

The first logical decision at block 15 examines the engine's volumetric efficiency, LOAD, which is calculated by dividing the measured mass air flow (MAF) by the theoretical mass air flow at 100% volumetric efficiency for that engine speed (n) and multiplying by a constant (K) (LOAD=K×MAF/n). If LOAD is less than a calibrateable value (RATUP_LD), closed throttle is assumed and RATCH is allowed to update. Since the volumetric efficiency at closed throttle will be a function of n and air bypass valve duty cycle (ISCDTY), RATUP_LD is a value pulled from a table of those two variable and is calibrated for each specific engine family. This logic is designed to allow RATCH to update during closed throttle deceleration conditions.

The second logical decision at block 15 examines an At Part Throttle (APT) mode flag. If the APT flag indicates closed throttle the RATCH signal is allowed to update. This allows correction for slow drifting (thermal) variations in the closed throttle reading of the TPS. Because of this, it is critical that the up learning time constant (TCRTP_UP) be set to a large value, to prevent RATCH from learning a high value on every throttle opening.

Since sensors are used to measure entry conditions for this algorithm, updating of the RATCH signal is halted if a fault is detected in any of the following circuits: the throttle position sensing circuit (FFG_TP=1), the engine speed sensing circuit (FFG_PIP=1), or the MAF circuit (FFG_MAF=1).

To ensure conditions are stable during updating a counter (TP_DIF_CTR) is incremented when updating conditions are correct. Updating is only allowed when the counter is above a calibrateable value (TP_CTR).

The decision as to which time constant to use for updating is made by determining whether the current value of Throttle Position (TP) is less than or greater than RATCH. If less than, a short time constant is used. Otherwise a longer time constant is used. This makes for a slower update in the upward direction.

To limit the time RATCH is allowed to increment, a calibrateable clip (TP_CTR_MAX) is compared to TP_DIF_CTR. If the counter is greater than TP_CTR_MAX, RATCH is not allowed to increment. This feature also allows a calibrator to disable the upward ratcheting portion of the algorithm by setting TP_CTR_MAX equal to less than tp_CTR.

One embodiment of this invention applies to a TPS transfer function which is low at closed throttle and increases with throttle opening. Another embodiment of the invention can be applied to sensors with transfer functions which start high at closed throttle and decrease in output as the throttle opens. Selection between two such embodiments can be done by two logical sign changes in the algorithm (blocks 15 and 18).

Before allowing Ratch to update in either direction, it is desirable to ensure the TP signal is relatively stable (abs (TP_ENG−TP_ENG_LAST)<DTPMAX) and there are no failures of TP, PIP, or MAF. Additionally, Ranch is only updated if TP is less than Ratch, or LOAD is less than RATUP_LD, or APT currently indicates closed throttle (APT=−1). When the above conditions are true a background loop counter is incremented (TP_DIF_CTR). If the above conditions are not true the counter is zeroed.

Advantageously, DTPMAX is calibrated to a small value to prevent electrical or mechanical noise from corrupting Ratch (0.5 to 1 percent of full scale is typical).

Advantageously, RATUP_LD is calibrated to a value approximately equal to LOAD at idle in gear with the A/C on (0.25 is typical). This allows Ratch to update during idle conditions (with the brake applied), but not during accelerations or cruises (with or without the brake applied).

Ratch is updated in the down direction any time TP is less than Ratch and TP_DIF_CTR is at greater than a calibrateable value (TP_CTR). When these conditions are true, a rolling average algorithm is used to move Ratch toward TP at a calibrateable time constant (TCRTP).

Advantageously, TP_CTR is set to a small value. Five background loops is typical. This allows the TP signal a few background loops to stabilize after sharp transients before updating Ratch.

Advantageously, TCRTP is set to a small value (0.5 to 1 sec is typical). This allows Ratch to quickly ratchet down and capture the closed throttle TP value on initial Electronic Engine Control Module (EEC) power-up.

In the upward direction, Ratch is not updated unless TP is greater than Ratch and TP_DIF_CTR is greater than or equal to TP_CTR. However, updating Ratch in the positive direction is a much more difficult decision. In summary, to keep Ratch from increasing during steady cruise, three conditions are required; 1) LOAD must be less than RATUP_LD, 2) the brakes have to be applied, and 3) the neutral/drive sensor must not indicate neutral. This will allow Ratch to update during idle and closed throttle deceleration conditions only.

Additionally, upward ratcheting is disabled during crank mode (CRKFLG<>1) to prevent electrical noise during engine cranking from corrupting Ratch. And the amount of time that upward ratcheting is allowed can be limited to a calibrateable number of background loops (TP_CTR_MAX).

When the above conditions are satisfied a rolling average algorithm is to move Ratch toward TP at a calibrateable time constant (TCRTP_UP).

Advantageously, TP_CTR_MAX is set to 255 background loops. This prevents it from interfering with upward ratcheting. Calibration by setting this value below TP_CTR will inhibit upward ratcheting.

Advantageously, TCRTP_UP is set to a value of 1 to 2 seconds. This allows Ratch to quickly correct for changes in the closed throttle value of TP.

In addition to the upward ratcheting, this algorithm will store Ratch in non-volatile or Keep Alive Memory (KAM) as RATKAM. To reduce the number of KAM writes, and therefore the likelihood of KAM corruption, Ratch is only written to KAM when the absolute value of the difference between Ratch and RATKAM is greater than a calibrateable value (RATDIFF).

Advantageously, RATDIFF is set to a small value (0.25 to 0.75 percent of full scale. This keeps RATKAM close to Ratch, but limits the possibility of KAM corruption.

RATKAM will be used for initialization and FMEM. During EEC power-up Ratch is initialized to RATKAM+RATADD. This limits the amount of ratcheting required on power-up. However, if a KAM Error is detected, Ratch is initialized to RATIV, and RATKAM is initialized to RATIV+RATADD.

Advantageously, RATADD is an adder to RATKAM, designed to make sure Ratch is initialized to a slightly higher value than TP at closed throttle, since it is more difficult to Ratch up than down. Typical value of RATADD is 1.5 to 2.5% counts.

Advantageously, RATIV is the Initial value of Ratch during a KAM Error and should be set to approximately 25% of full scale. During FMEM Ratch is set equal to RATKAM and TP is calculated as a function of measured air mass.

Various modifications and variations will no doubt occur to those skilled in the arts to which this invention pertains. Such variations which basically rely on the teachings through which this disclosure has advanced the art are properly considered within the scope of this invention.

We claim:

1. A method of determining the throttle position of an internal combustion engine by providing an internal combustion engine, a throttle position sensor coupled to the engine, and an electronic engine control for governing the engine, by using electronic engine control and a throttle position sensor to provide a throttle position output, further including:

determining the engine's volumetric efficiency;

determining a minimum calibrateable time duration, T, during which engine operating conditions are stable;

limiting the amount of time during which updating of throttle position is permitted;

generating a rolling average of throttle position; and initializing the value of a Ratch parameter;

determining whether the throttle position sensor output is stable;

if no, setting a background loop counter to 0 and ending;

if yes, determining whether there is a throttle position, ignition, or mass air flow failure;

if no, setting the background loop counter to 0 and ending;

if yes, determining whether the throttle is closed;

if no, setting the background loop counter to 0 and ending;

if yes, incrementing the background loop counter by one;

determining whether the throttle position value is equal to the Ratch value or the background loop counter is less than a throttle position counter;

if no, ending;

if yes, determining whether the throttle position value is less than the Ratch value;

if yes, allowing a reduction in the value of Ratch, Downward Ratching, at rate "A" and computing the rolling average of the value of Ratch;

if the difference between the value of Ratch and the value of a previously stored value, RATKAM, is great enough, updating the value of RATKAM with the value of Ratch;

if no, determining whether the engine is running;

if no, ending;

if yes, determining whether the time, T, has elapsed;

if yes, ending;

if no, determining whether the brake is applied;

if no, ending;

if yes, determining whether the drive switch indicates neutral;

if yes, ending;

if no, allowing an increase in the value of Ratch, Upward Ratching, at the rate of "B" and computing the rolling average of the value of Ratch;

if the value of Ratch is greater to the value of a calibrateable parameter, RATIV, setting the value of Ratch to the value of RATIV; and if the difference between the value of Ratch and the value of a calibrateable parameter, RATKAM, is great enough, updating the value of RATKAM with the value of Ratch.

* * * * *